(12) United States Patent
Yoshimi et al.

US008559105B2

(10) Patent No.: US 8,559,105 B2
(45) Date of Patent: Oct. 15, 2013

(54) POLARIZING PLATE, OPTICAL FILM AND IMAGE DISPLAY

(75) Inventors: Hiroyuki Yoshimi, Ibaraki (JP); Hiroaki Mizushima, Ibaraki (JP); Toshimasa Sugimura, Ibaraki (JP); Minoru Miyatake, Ibaraki (JP); Takeharu Kitagawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 706 days.

(21) Appl. No.: 12/680,035

(22) PCT Filed: Sep. 22, 2008

(86) PCT No.: PCT/JP2008/067084
§ 371 (c)(1),
(2), (4) Date: Mar. 25, 2010

(87) PCT Pub. No.: WO2009/041383
PCT Pub. Date: Apr. 2, 2009

(65) Prior Publication Data
US 2010/0202051 A1    Aug. 12, 2010

(30) Foreign Application Priority Data

Sep. 27, 2007   (JP) .................................. 2007-251321

(51) Int. Cl.
*G02B 5/30*   (2006.01)
(52) U.S. Cl.
USPC ............................... 359/487.01; 359/487.02
(58) Field of Classification Search
USPC ............ 359/487.01, 487.02; 349/96; 313/112
See application file for complete search history.

(56) References Cited

U.S. PATENT DOCUMENTS

| | | | |
|---|---|---|---|
| 2,237,567 A * | 4/1941 | Land ........................ | 359/487.02 |
| 2,289,713 A * | 7/1942 | Land ........................ | 359/487.06 |
| 4,387,133 A * | 6/1983 | Ichikawa et al. .............. | 428/215 |
| 5,700,296 A * | 12/1997 | Ogino et al. ........................ | 8/489 |
| 6,511,756 B1 | 1/2003 | Obuchi et al. | |
| 6,831,713 B2 * | 12/2004 | Sugino et al. .................. | 349/96 |
| 6,840,635 B2 * | 1/2005 | Maeda et al. ................. | 359/512 |
| 7,067,985 B2 * | 6/2006 | Adachi ...................... | 315/169.3 |
| 2004/0212885 A1 | 10/2004 | Mizushima et al. | |
| 2006/0077326 A1 | 4/2006 | Ishibashi et al. | |
| 2007/0159576 A1 | 7/2007 | Tanabe et al. | |
| 2008/0007828 A1 | 1/2008 | Tsujiuchi et al. | |
| 2010/0051192 A1 | 3/2010 | Tanabe et al. | |

FOREIGN PATENT DOCUMENTS

| | | |
|---|---|---|
| CN | 1670594 A | 9/2005 |
| CN | 1683464 A | 10/2005 |
| CN | 1758078 A | 4/2006 |
| JP | 07-077608 A | 3/1995 |
| JP | 11-216817 A | 8/1999 |
| JP | 2000-249833 A | 9/2000 |
| JP | 2000-338329 A | 12/2000 |
| JP | 2001-221915 A | 8/2001 |
| JP | 2001-343522 A | 12/2001 |
| JP | 2002-52227 A | 2/2002 |
| JP | 2003-131034 A | 5/2003 |
| JP | 2003-232930 A | 8/2003 |
| JP | 2004-20672 A | 1/2004 |
| JP | 2004-90546 A | 3/2004 |
| JP | 2004-341515 A | 12/2004 |
| JP | 2005-520209 A | 7/2005 |
| JP | 2006-096023 A | 4/2006 |
| JP | 2006-169428 A | 6/2006 |
| JP | 2007-128025 A | 5/2007 |
| JP | 2007-140092 A | 6/2007 |
| JP | 2007-225862 A | 9/2007 |
| WO | 03/076985 A1 | 9/2003 |
| WO | 2005/085918 A1 | 9/2005 |
| WO | 2005/109051 A | 11/2005 |

OTHER PUBLICATIONS

Japanese Office Action dated Nov. 30, 2010, issued in corresponding Japanese Patent Application No. 2008-236593.
Chinese Office Action dated Oct. 20, 2011, issued in corresponding Chinese Patent Application No. 200880108683.5.
Japanese Office Action dated Nov. 11, 2011, issued in corresponding Japanese Patent Application No. 2008-236593.
Korean Office Action dated Dec. 28, 2011, issued in corresponding Korean Patent Application No. 2010-7006109.
International Search Report of PCT/JP2008/067084, mailing date of Oct. 28, 2008.
Japanese Office Action dated Feb. 22, 2011, issued in corresponding Japanese Patent Application No. 2008-236593.
Notification of Transmittal of Translation of the International Preliminary Report on Patentability (Form PCT/IB/338) with mailing date of May 14, 2010 for corresponding International Patent Application PCT/JP2008/067084 with Forms PCT/IB/373 and PCT/ISA/237.
Japanese Office Action dated Jul. 5, 2011, issued in corresponding Japanese Patent Application No. 2011-010303.
Chinese Office Action dated Sep. 13, 2012, issued in corresponding Chinese patent application No. 200880108683.5, w/ English translation.
Korean Office Action dated Nov. 20, 2012, issued in corresponding Korean Application No. 2010-7006109, (8 pages). With English Translation.
Japanese Office Action Dated Jan. 8, 2013, issued in corresponding Japanese Patent Application No. 2011-016703, with English Translation (6 pages).

(Continued)

*Primary Examiner* — Frank Font
(74) *Attorney, Agent, or Firm* — Westerman, Hattori, Daniels & Adrian, LLP

(57) ABSTRACT

A polarizing plate of the present invention includes a stretched laminate that is a laminate including a base material layer and a hydrophilic polymer layer and has undergone a stretching process, and at least a dichroic substance is adsorbed to the hydrophilic polymer layer. The polarizing plate of the present invention can be prevented from curling even when the polarizer is reduced in thickness.

15 Claims, No Drawings

(56) References Cited

OTHER PUBLICATIONS

Chinese Office Action dated Jul. 3, 2013, issued in corresponding Chinese Patent Application No. 200880108683.5 with English translation (10 pages).

Taiwanese Office Action dated Jul. 25, 2013, issued in corresponding Taiwanese Patent Application No. 097136956, w/ English translation.

* cited by examiner

POLARIZING PLATE, OPTICAL FILM AND IMAGE DISPLAY

TECHNICAL FIELD

The present invention relates to a polarizing plate. The polarizing plate may be used alone or in the form of a laminated optical film to form an image display such as a liquid crystal display (LCD), an organic electro-luminescent (EL) display, a cathode ray tube (CRT), a plasma display panel (PDP), or an organic light-emitting diode (OLED).

BACKGROUND ART

Polarizing plates are used in image displays (particularly, liquid crystal displays). To provide bright images with high color reproducibility, polarizing plates are required to have both high transmittance and high degree of polarization. Such polarizing plates are produced with a laminate including a polarizer and a transparent protective film bonded to one or both sides of the polarizer with an adhesive. The transparent protective film is produced with triacetylcellulose with high water-vapor permeability, or the like.

Polarizers are conventionally produced by orienting a dichroic substance such as dichroic iodine or a dichroic dye in a polyvinyl alcohol film. Specifically, polarizers are produced by subjecting a polyvinyl alcohol film being fed from a raw material roll to swelling, dyeing, crosslinking, stretching, washing with water, drying, and so on (Patent Literature 1).

The above process is performed using a roll of a polyvinyl alcohol film, and therefore, as a result of taking into account the handleability of the film and so on, there is a limit to the reduction in the thickness of the resulting polarizer. Therefore, the thickness of the polarizer obtained by the above process is generally more than 30 µm. However, as the thickness of the polarizer increases, the contraction stress of the polarizer or the polarizing plate generated therewith increases, which causes a problem in which when these are attached to form an image display such as a liquid crystal display, curling occurs to cause light leaks. The problem of such curling of the polarizing plate becomes significant, when water enters and leaves the polarizer under a humidified environment. On the other hand, the polyvinyl alcohol film from the material roll is a thin film with a thickness of about 30 µm, which also causes a problem with productivity, such as breaking of the film by a stretching process.

Concerning the problem of curling under a humidified environment, it is known that curling can be suppressed when the polarizer is entirely covered with a transparent protective film with low water-vapor permeability so that water can be inhibited from entering or leaving the polarizer under a humidified environment (Patent Literatures 2 and 3). However, even when such a transparent protective film with low water-vapor permeability is used, the entry of water from the side of the polarizing plate cannot be sufficiently suppressed. In addition, when a typical polarizing plate having transparent protective films placed on both sides is formed using transparent protective films with low water-vapor permeability, the process of forming the polarizing plate needs to include removing water from the polarizer and then bonding the transparent protective films to the polarizer. Therefore, when transparent protective films with low water-vapor permeability are used, it takes time to remove water, which is not preferred in view of productivity.

Patent Literature 1: JP-A No. 2004-341515
Patent Literature 2: JP-A No. 2002-052227
Patent Literature 3: JP-A No. 2004-090546

DISCLOSURE OF INVENTION

Objects to be Solved by the Invention

An object of the present invention is to provide a polarizing plate having a polarizer that can be prevented from curling even when the polarizer is reduced in thickness. Another object of the present invention is to provide a polarizing plate that can be prevented from curling even under a humidified environment.

A further object of the present invention is to provide an optical film including a laminate including the polarizing plate and to provide an image display such as a liquid crystal display produced with the polarizing plate or the optical film.

Means for Solving the Problems

As a result of intensive investigations for solving the problems described above, the inventors have found that the objects can be achieved by the polarizing plate described below, and the present invention has been completed.

The present invention relates to a polarizing plate, including: a stretched laminate that is a laminate including a base material layer and a hydrophilic polymer layer and has undergone a stretching process, and at least a dichroic substance is adsorbed to the hydrophilic polymer layer.

In the polarizing plate, the laminate including the base material layer and the hydrophilic polymer layer that is obtained by applying a hydrophilic polymer-containing aqueous solution to the base material layer and then drying the solution can be used.

In the polarizing plate, the laminate including the base material layer and the hydrophilic polymer layer that is formed by co-extrusion of a base material layer-forming material and a hydrophilic polymer layer-forming material can be used.

In the polarizing plate, as the laminate including the base material layer and the hydrophilic polymer layer, the base material layer and the hydrophilic polymer layer that are laminated directly to each other can be used.

In the polarizing plate, a hydrophilic polymer that forms the hydrophilic polymer layer is preferably a polyvinyl alcohol resin.

In the polarizing plate, the hydrophilic polymer layer of the stretched laminate preferably has a thickness of 0.5 µm to 30 µm.

In the polarizing plate, the hydrophilic polymer layer that is crosslinked can be used.

In the polarizing plate, the base material layer of the stretched laminate preferably has a water-vapor permeability of 120 g/m$^2$/24 h or less.

The present invention also relates to an optical film, including: a laminate comprising at least one piece of the polarizing plate.

The present invention also relates to an image display, including: the polarizing plate or the optical film.

The present invention also relates to a method for manufacturing a polarizing plate, including:

a step including applying a hydrophilic polymer-containing solution to a base material layer and then drying the hydrophilic polymer-containing solution to form a hydrophilic polymer layer on the base material layer, so that a laminate including the base material layer and the hydrophilic polymer layer is obtained;

a stretching step including stretching the laminate to form a stretched laminate; and a dyeing step including adsorbing a dichroic substance to the hydrophilic polymer layer of the laminate.

The present invention also relates to a method for manufacturing a polarizing plate, including:

a step including co-extruding a base material layer-forming material and a hydrophilic polymer layer-forming material to form a laminate including a base material layer and a hydrophilic polymer layer;

a stretching step including stretching the laminate to form a stretched laminate; and a dyeing step including adsorbing a dichroic substance to the hydrophilic polymer layer of the laminate.

In the method for manufacturing a polarizing plate, a hydrophilic polymer that forms the hydrophilic polymer layer is preferably a polyvinyl alcohol resin.

In the method for manufacturing a polarizing plate, the hydrophilic polymer layer of the stretched laminate preferably has a thickness of 0.5 μm to 30 μm.

In the method for manufacturing a polarizing plate, further a step comprising crosslinking the hydrophilic polymer layer of the laminate can be performed.

In the polarizing plate, the base material layer of the stretched laminate preferably has a water-vapor permeability of 120 g/m$^2$/24 h or less.

Effects of the Invention

The polarizing plate of the present invention includes a stretched laminate obtained by stretching a laminate including a base material layer and a hydrophilic polymer layer, in which the hydrophilic polymer layer having a dichroic substance adsorbed thereto functions as a polarizer in the stretched laminate. The hydrophilic polymer layer (polarizer) can be made thin, because the hydrophilic polymer layer serving as the polarizer and the base material layer are laminated and integrated with each other to form the polarizing plate. Thus, in the polarizing plate of the present invention, the polarizer integrated with the base material can be reduced in thickness, so that the polarizing plate of the present invention can be controlled to have low contraction stress even when attached to form a liquid crystal display, and therefore, light leaks caused by curling of the polarizing plate can be suppressed.

In addition, in the polarizing plate of the present invention, the base material layer of the stretched laminate may have a water-vapor permeability of 120 g/m$^2$/24 h or less, so that the entry of water from the surface of the base material layer can be effectively suppressed even under a humidified environment. Further, in the polarizing plate of the present invention, the polarizer can be made of a thin hydrophilic polymer layer. Therefore, the entry of water from the side of the polarizing plate can also be suppressed, and the polarizer made of the hydrophilic polymer layer can be prevented from expanding or shrinking with water. As a result, the polarizing plate of the present invention is less susceptible to curling even under a humidified environment, when the base material layer of the stretched laminate has a water-vapor permeability of 120 g/m$^2$/24 h or less.

The base material layer and the hydrophilic polymer layer are stretched in the form of an integrated laminate, because the polarizing plate of the present invention includes a stretched laminate obtained by stretching a laminate including a base material layer and a hydrophilic polymer layer, as mentioned above. Therefore, even though the polarizer (polarizing plate) obtained according to the present invention is thinner than a conventional polarizer derived from a polyvinyl alcohol film, the polarizer can have undergone stretching more uniformly than the conventional polarizer obtained by stretching only a polyvinyl alcohol film, so that the polarizer can have a controlled orientation (controlled variations in the absorption axis) and that the polarizer (polarizing plate) can have improved properties. When the polarizing plate of the present invention is produced, a laminate including a base material layer and a hydrophilic polymer layer is used and subjected to a stretching process, in place of a thin polyvinyl alcohol film. Therefore, breaking of a film and other problems during a stretching process can be reduced, so that the productivity can be improved as compared with a conventional method of producing a polarizer. In addition, the polarizing plate obtained according to the present invention has the base material layer placed on one side of the hydrophilic polymer layer. Therefore, the base material layer may be used, as it is, as a transparent protective film for the polarizer, so that the polarizing plate can be produced with increased productivity.

BEST MODE FOR CARRYING OUT THE INVENTION

The polarizing plate of the present invention includes a stretched laminate is a laminate including a base material layer and a hydrophilic polymer layer and the laminate has undergone a stretching process. A dichroic substance is adsorbed to at least the hydrophilic polymer layer of the stretched laminate. In an embodiment of the present invention, the stretched laminate of the polarizing plate may be obtained by subjecting a laminate including a base material layer and a hydrophilic polymer layer to a stretching process and a dichroic dye adsorbing process.

Any material conventionally used to form a transparent protective film for a polarizer may be used for the base material layer. For example, a thermoplastic resin with a high level of transparency, mechanical strength, thermal stability, water-blocking performance, isotropy, stretchability, or the like may be used as a material to form the base material layer. Examples of such a thermoplastic resin include a cellulose resin such as triacetylcellulose, a polyester resin such as polyethylene terephthalate or polyethylene naphthalate, a polyethersulfone resin, a polysulfone resin, a polycarbonate resin, a polyamide resin such as nylon or aromatic polyamide, a polyimide resin, a polyolefin resin such as polyethylene, polypropylene or an ethylene-propylene copolymer, a cyclo system- or norbornene structure-containing cyclic polyolefin resin (a norbornene resin), a (meth)acrylic resin, a polyarylate resin, a polystyrene resin, a polyvinyl alcohol resin, and any blend thereof. The base material layer may also have a thin layer formed to improve the adhesion to the hydrophilic polymer layer, such as a primer layer (an undercoat layer).

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned as a material of the base material layer. As an illustrative example, a film may be mentioned that is made of a resin composition including alternating copolymer comprising iso-butylene and N-methyl maleimide, and acrylonitrile-styrene copolymer. A film including mixture extruded article of resin compositions etc. may be used.

Since the films are less in retardation and less in photoelastic coefficient, faults such as unevenness due to a strain in a polarizing plate can be removed and besides, since they are less in moisture permeability, they are excellent in durability under humidified environment.

Besides the above materials, the base material layer may also contain any one or more appropriate additives. Examples of such an additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the base material layer is preferably from 50 to 100% by weight, more preferably from 50 to 99% by weight, even more preferably from 60 to 98% by weight, in particular, preferably from 70 to 97% by weight. If the content of the thermoplastic resin in the base material layer is less than 50% by weight, high transparency and other properties inherent in the thermoplastic resin may be insufficiently exhibited.

After the stretching process, the water-vapor permeability of the base material layer (the water-vapor permeability in the stretched laminate) is preferably from 0 to 120 $g/m^2/24$ h, more preferably from 0 to 80 $g/m^2/24$ h, in particular, preferably from 0 to 20 $g/m^2/24$ h. If the water-vapor permeability is more than 120 $g/m^2/24$ h, water may easily intrude into the base material layer from its surface under both humidified and hygrothermal environment, so that the hydrophilic layer may expand to cause the polarizing plate to curl. If the water-vapor permeability is too high, the polarizing plate may be useless in some cases.

In an embodiment of the present invention, the water-vapor permeability of the base material layer of the stretched laminate may be the water-vapor permeability of a base material layer produced by subjecting only the base material layer (with no hydrophilic polymer layer placed thereon) to the stretching process in the same way as when the polarizing plate is produced.

The water-vapor permeability of the base material layer of the stretched laminate may be controlled by controlling the thickness of the base material layer of the stretched laminate. In order to achieve the low water-vapor permeability (a water-vapor permeability of 0 to 120 $g/m^2/24$ h), a low water-vapor permeability material is preferably used to form the base material layer. Among the resins listed above, a polycarbonate resin, a polyarylate resin, a polyester resin, a polyamide resin, a polyolefin resin, a cyclic olefin resin, a (meth)acrylic resin, or any blend thereof is preferably used as a low water-vapor permeability material.

In view of low water-vapor permeability, the base material layer according to the present invention is particularly preferably produced with at least one material selected from a polyolefin resin, a cyclic polyolefin resin, and a (meth)acrylic resin.

Examples of the polyolefin resin include polyethylene, polypropylene and so on. For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used. Examples of the lactone ring structure-containing (meth)acrylic reins are disclosed in JP-A Nos. 2000-230016, 2001-151814, 2002-120326, 2002-254544, and 2005-146084.

The (meth)acrylic resin that may be used includes an acrylic resin having structural units of unsaturated carboxylate alkyl ester and glutaric anhydride. Examples of such an acrylic resin are disclosed in JP-A Nos. 2004-70290, 2004-70296, 2004-163924, 2004-292812, 2005-314534, 2006-131898, 2006-206881, 2006-265532, 2006-283013, 2006-299005, and 2006-335902.

The (meth)acrylic resin that may be used also includes a thermoplastic resin having a glutarimide unit, a (meth)acrylic ester unit, and an aromatic vinyl unit. Examples of such a thermoplastic resin are disclosed in JP-A Nos. 2006-309033, 2006-317560, 2006-328329, 2006-328334, 2006-337491, 2006-337492, 2006-337493, and 2006-337569.

In view of low retardation, the base material layer according to the present invention is preferably produced with at least one material selected from a cellulose resin, a polyolefin resin, a cyclic polyolefin resin, and a (meth)acrylic resin.

The cellulose resin is an ester of cellulose and a fatty acid. Examples of such a cellulose ester resin include cellulose triacetate, cellulose diacetate, cellulose tripropionate, cellulose dipropionate, and the like. In particular, cellulose triacetate is preferred. Much commercially available cellulose triacetates are placing on sale and are advantageous in view of easy availability and cost. Examples of commercially available products of cellulose triacetate include UV-50, UV-80, SH-80, TD-80U, TD-TAC, and UZ-TAC (trade names) manufactured by Fujifilm Corporation, and KC series manufactured by Konica Minolta. In general, these cellulose triacetate products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetylcellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

The thickness of the base material (before stretching) is generally from about 1 to about 500 μm in view of workability such as strength or handleability or thin layer formability, while it may be determined as needed. In particular, it is preferably from 1 to 300 μm, more preferably from 5 to 200 μm. In particular, the base material layer preferably has a thickness of 5 to 150 μm. In contrast, in view of workability such as strength or handleability, the thickness of the base material layer of the stretched laminate (the base material layer after stretching) may be from about 1 to about 400 μm, preferably from 1 to 200 μm, more preferably from 5 to 100 μm. The thickness of the base material layer of the stretched laminate is determined by the thickness of the base material layer (before stretching) and the stretch ratio. In general, the water-vapor permeability is proportional to the inverse of the thickness. Therefore, the water-vapor permeability of the base material layer of the stretched laminate may be adjusted to be in the above range by controlling the thickness of the unstretched base material layer and the stretch ratio.

In an embodiment of the present invention, a polyvinyl alcohol based material may be used as a hydrophilic polymer to form the hydrophilic polymer layer of the laminate. Examples of polyvinyl alcohol based material include polyvinyl alcohol and derivatives thereof. Examples of polyvinyl alcohol derivatives include polyvinyl formal and polyvinyl acetal and those modified with olefins such as ethylene and propylene, those modified with unsaturated carboxylic acids such as acrylic acid, methacrylic acid and crotonic acid, those modified with alkyl esters of unsaturated carboxylic acids, and those modified with acrylamide or the like. The degree of polymerization of the polyvinyl alcohol is preferably from about 100 to about 10,000, more preferably from 1,000 to 10,000. The degree of saponification of the polyvinyl alcohol is generally from about 80 to about 100% by mole. As for the rest, ethylene-vinyl acetate copolymer type partially saponified film, dehydrated polyvinyl alcohol and dehydrochlorinated polyvinyl chloride, etc. may be mentioned as the hydrophilic polymer. In particular, the polyvinyl alcohol based material as the hydrophilic polymer to be used is preferably polyvinyl alcohol.

The polyvinyl alcohol based material may also contain an additive such as a plasticizer and a surfactant. Examples of the plasticizer include polyols and condensates thereof, such as glycerol, diglycerol, triglycerol, ethylene glycol, propylene glycol, and polyethylene glycol. The plasticizer is, but not limited to, preferably used at a concentration of 20% by weight or less in the polyvinyl alcohol based material.

In an embodiment of the present invention, a laminate including the base material layer and the hydrophilic polymer layer is used. The thickness of the hydrophilic polymer layer of the laminate may be appropriately determined depending on the thickness of the hydrophilic polymer layer (stretched product) of the stretched laminate to be produced by stretching the laminate. The thickness of the hydrophilic polymer layer (stretched product) of the stretched laminate is preferably from 0.5 to 30 μm, more preferably from 1 to 20 μm, even more preferably from 2 to 10 μm, because it is important to use a thin polarizer. If the hydrophilic polymer layer (stretched product) has a thickness of less than 0.5 μm, variations in thickness may have a significant effect during the manufacture, so that a poor appearance may easily occur, which is not preferred.

As a result of extension or contraction by the stretching process, the thickness of the hydrophilic polymer layer of the laminate is reduced to the above thickness. In general, therefore, the thickness of the hydrophilic polymer layer of the laminate is preferably from about 1 to about 50 more preferably from 2 to 30 μm. The thickness of the hydrophilic polymer layer of the laminate or the stretched laminate may be measured after the hydrophilic polymer layer is delaminated from the base material layer. The thickness may be measured with a thickness gauge or the like.

For example, the laminate for use in an embodiment of the present invention may be obtained by coating the base material layer with a hydrophilic polymer-containing aqueous solution and then drying the coating. In the coating process, the hydrophilic polymer layer may be formed on the base material layer with a primer layer interposed therebetween or formed directly on the base material layer, so that a laminate having the base material layer and the hydrophilic polymer layer integrated with each other can be obtained. The aqueous solution may be prepared by dissolving a hydrophilic polymer powder, a pulverized product or cut pieces of a hydrophilic polymer film, or the like in appropriately heated water (hot water). The aqueous solution may be applied to the base material layer by a coating method appropriately selected from a wire bar coating method, a roll coating method such as reverse coating or gravure coating, a spin coating method, a screen coating method, a fountain coating method, a dipping method, a spay method, and the like. When the base material layer has a primer layer, the aqueous solution may be applied to the primer layer. When the base material layer has no primer layer, the aqueous solution may be applied directly to the base material layer. The drying temperature is generally from 50 to 200° C., preferably from 80 to 150° C., and the drying time is generally from about 5 to about 30 minutes.

Alternatively, for example, the laminate for use in an embodiment of the present invention may be formed by co-extrusion of a base material layer-forming material and a hydrophilic polymer layer-forming material. The co-extrusion makes it possible to form a laminate having a base material layer and a hydrophilic polymer layer integrated with each other. The co-extrusion preferably includes adding the base material layer-forming material and the hydrophilic polymer layer-forming material, respectively, to a co-extruder and performing co-extrusion so that the thicknesses of the co-extruded base material and hydrophilic polymer layers can be controlled in the above ranges, respectively.

The polarizing plate of the present invention is obtained by subjecting the laminate including the base material layer and the hydrophilic polymer layer to a stretching process and a dyeing process with a dichroic substance. In the stretched laminate having undergone each process, the hydrophilic polymer layer functions as a polarizer, because the hydrophilic polymer layer has undergone the stretching process and the dyeing process with the dichroic substance and has the dichroic substance adsorbed thereto.

The stretching process is generally performed by uniaxially stretching the laminate. The uniaxial stretching may be any of longitudinal stretching performed in the longitudinal direction of the laminate and transverse stretching performed in the width direction of the laminate. In an embodiment of the present invention, transverse stretching is preferably performed. In the transverse stretching, the laminate may be shrunken in the longitudinal direction, while it is stretched in the width direction. Examples of transverse stretching include fixed-end uniaxial stretching with one end fixed through a tenter and free-end uniaxial stretching with no end fixed. Examples of longitudinal stretching include stretching between rolls, compression stretching, and stretching with a tenter. The stretching process may be a multistage process. The stretching process may also be performed by biaxial stretching or oblique stretching.

Any of a wet stretching method and a dry stretching method may be used in the stretching process. In an embodiment of the present invention, a dry stretching method is preferably used, because it makes it possible to set a wide temperature range in the process of stretching the laminate. In a dry stretching method, the laminate is generally heated at about 50 to about 200° C., preferably 80 to 180° C., more preferably 100 to 160° C., while it is stretched.

In the stretching process, the laminate may be stretched to a total stretch ratio of 1.5 to 17 times, relative to the original length of the laminate. The total stretch ratio is preferably 1.5 to 10 times, more preferably 1.5 to 8 times. When stretching is performed not only in the stretching process but also in other processes, the total stretch ratio means the sum total of the stretch ratios over the processes. The total stretch ratio may be appropriately determined taking into account the stretch ratio in other processes. If the total stretch ratio is too low, the orientation may be insufficient so that it may be difficult to obtain a polarizer with a high level of optical properties (degree of polarization). On the other hand, if the total stretch ratio is too high, breakage may easily occur during stretching, or the resulting polarizer may be so thin that the workability may be low in the following process.

The dyeing process may be performed by adsorbing a dichroic substance to the hydrophilic polymer layer of the laminate. For example, the dichroic substance may be iodine, or an organic dye or the like. Examples of organic dyes that may be used include Red BR, Red LR, Red R, Pink LB, Rubin BL, Bordeaux GS, Sky Blue LG, Lemon Yellow, Blue B, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, Fast Black, and the like. These dichroic substances may be used singly or in combination of two or more thereof.

For example, the dyeing process may be performed by immersing the laminate in a solution (dyeing solution) containing the dichroic substance. A solution of the dichroic substance in a solvent may be used as the dyeing solution. Water is generally used as the solvent, while an organic solvent compatible with water may also be added to the solvent. The concentration of the dichroic substance is preferably in the range of 0.01 to 10% by weight, more preferably 0.02 to 7% by weight, in particular preferably 0.025 to 5% by weight.

When iodine is used as the dichroic substance, an iodide is preferably further added, because it makes it possible to further improve the dyeing efficiency. Examples of such an iodide include potassium iodide, lithium iodide, sodium iodide, zinc iodide, aluminum iodide, lead iodide, copper iodide, barium iodide, calcium iodide, tin iodide, and titanium iodide. The content of the iodide in the dyeing solution is preferably from 0.01 to 10% by weight, more preferably from 0.1 to 5% by weight. In particular, potassium iodide is preferably added, and the ratio (weight ratio) of iodine to potassium iodide is preferably in the range of 1:5 to 1:100, more preferably 1:6 to 1:80, in particular preferably 1:7 to 1:70.

The time of immersion of the laminate in the dyeing solution is generally, but not limited to, preferably in the range of 15 seconds to 5 minutes, more preferably 1 to 3 minutes. The temperature of the dyeing solution is preferably in the range of 10 to 60° C., more preferably 20 to 40° C.

The dyeing process may include adsorbing the dichroic substance to the hydrophilic polymer layer of the laminate to orient the dichroic substance. The dyeing process may be performed before, after or simultaneously with the stretching process. In order to well orient the dichroic substance adsorbed to the hydrophilic polymer layer, the dyeing process is preferably performed after the laminate is subjected to the stretching process.

The polarizing plate of the present invention may have undergone a crosslinking process in addition to the stretching process and the dyeing process. For example, the crosslinking process may be performed by immersing the laminate in a solution (crosslinking solution) containing a crosslinking agent. A known conventional substance may be used as the crosslinking agent. Examples thereof include a boron compound such as boric acid or borax, glyoxal, glutaraldehyde, and the like. These may be used singly or in combination of two or more thereof.

A solution of the crosslinking agent in a solvent may be used as the crosslinking solution. Water is typically used as the solvent, while the solution may also contain an organic solvent compatible with water. The concentration of the crosslinking agent in the solution is preferably, but not limited to, in the range of 1 to 10% by weight, more preferably 2 to 6% by weight.

An iodide may be added to the crosslinking solution, because it makes it possible to impart uniform in-plane properties to the polarizer. Examples of such an iodide include potassium iodide, lithium iodide, sodium iodide, zinc iodide, aluminum iodide, lead iodide, copper iodide, barium iodide, calcium iodide, tin iodide, and titanium iodide. The content of the iodide is preferably from 0.05 to 15% by weight, more preferably from 0.5 to 8% by weight.

In general, the time of immersion of the laminate in the crosslinking solution is preferably from 15 seconds to 5 minutes, more preferably from 30 seconds to 3 minutes. The temperature of the crosslinking solution is preferably in the range of 10 to 60° C., more preferably 20 to 50° C.

Like the dyeing process, the crosslinking process may also be performed using a method of applying or spraying the crosslinking solution. If the crosslinking agent is added to the dyeing solution, the crosslinking process and the dyeing process can be performed at the same time. The crosslinking process may also be performed simultaneously with the stretching process.

The polarizing plate of the present invention may have undergone a metal ion treatment in addition to the above processes. The metal ion treatment may be performed by immersing the laminate in an aqueous solution containing a metal salt. The metal ion treatment makes it possible to add various metal ions to the hydrophilic polymer layer of the laminate.

Particularly in order to control the color tone or to impart durability, ions of transition metal such as cobalt, nickel, zinc, chromium, aluminum, copper, manganese, or iron are preferably used as the metal ion. From the viewpoints of adjusting the color tone and imparting durability, zinc ions are particularly preferred among the metal ion. Examples of zinc salts include zinc halides such as zinc chloride and zinc iodide, and zinc sulfate and zinc acetate.

The metal ion impregnation treatment may use a metal salt solution. The concentration of zinc ion in the metal salt solution may be from about 0.1 to about 10% by weight, preferably from 0.3 to 7% by weight. A metal salt solution containing potassium ion and iodide ion derived from potassium iodide or the like is preferably used, because it can facilitate the metal ion impregnation. The concentration of potassium iodide in the metal salt solution is preferably from about 0.1 to about 10% by weight, more preferably from 0.2 to 5% by weight.

In the metal impregnation treatment, the temperature of the metal salt solution is generally from about 15 to about 85° C., preferably from 25 to 70° C., and the immersion time is generally within the range from about 1 to about 120 seconds, preferably from 3 to 90 seconds. The metal ion impregnation treatment may be performed at any stage. A zinc salt may be allowed to coexist in the dyeing solution and/or the crosslinking solution so that the metal ion treatment can be performed simultaneously with the dyeing process and/or the crosslinking process. The metal ion treatment may also be performed simultaneously with the stretching process.

After the process or treatment is performed, the resulting stretched laminate may be subjected to a washing process. The washing process may be performed using a solution of an iodide such as potassium iodide. The concentration of the iodide in the iodide solution is generally in the range of about 0.5 to about 10% by weight, 0.5 to 8% by weight, or 1 to 6% by weight.

The temperature of the washing process with the iodide solution is generally from about 15 to about 60° C., preferably from 25 to 40° C. The immersion time is generally in the range of about 1 to 120 seconds, preferably 3 to 90 seconds. The washing process with the iodide solution may be performed at any stage before a drying process.

A water washing process may also be performed as the washing process. The water washing process may generally be performed by immersing the stretched laminate in pure water such as ion-exchanged water or distilled water. The water washing temperature is generally in the range of 5 to 50° C., preferably 10 to 45° C., more preferably 15 to 40° C. The immersion time is generally from about 10 to about 300 seconds, preferably from about 20 to about 240 seconds.

After the washing process, a drying process may be performed. Any appropriate method (such as air drying, blow drying, or drying by heat) may be used in the drying process. In the case of drying by heat, for example, the drying temperature is generally from about 20 to about 80° C., and the drying time is generally about 1 to about 10 minutes. A polarizer is obtained as described above.

The polarizing plate (stretched laminate) of the present invention has the base material layer placed on one side of the hydrophilic polymer layer (polarizer). The base material layer may be used, as it is, as a transparent protective film for the polarizing plate. On the other hand, a transparent protective film may be bonded to the other side of the hydrophilic polymer layer, on which no base material layer is placed. Alternatively, the hydrophilic polymer layer may be peeled off from the base material layer, and then transparent protective films may be bonded to both sides of the hydrophilic polymer layer.

Any of the same materials as those listed above for the base material layer may be used to form the transparent protective film.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessary, lighting system, and by incorporating driving circuit. In the present invention, except that a polarizing plate or an optical film by the present invention is used, there is especially no limitation to use any conventional methods. Also any liquid crystal cell of arbitrary type, such as TN type, STN type, π type, VA type and IPS type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

Some examples of the present invention are described below, which are not intended to limit embodiments of the present invention.

<Measurement of Retardation>

Retardations nx, ny and nz were measured at a wavelength of 590 nm using a retardation analyzer (KOBRA 21-ADH (product name) manufactured by Oji Scientific Instruments) based on the principle of parallel Nicols rotation method, and the in-plane retardation Re, the retardation Rth in the thickness direction, and Nz were calculated from the nx, ny and nz values and the thickness (d) of the film, in which nx, ny and nz are the refractive indices of the film in the directions of its slow axis, fast axis and thickness, respectively, d is the thickness (nm) of the film, and the direction of the slow axis is a direction in which the in-plane refractive index of the film is maximum.

<Measurement of Water-Vapor Permeability>

The water-vapor permeability was measured as the gram weight of water vapor passing through a sample with an area of 1 m² for 24 hours at a temperature of 40° C. and a humidity of 92% RH according to the water-vapor permeability test (cup method) of JIS Z 0208.

Example 1

(Preparation of Aqueous Solution Containing Hydrophilic Polymer)

A polyvinyl alcohol film manufactured by KURARAY CO., LTD. (2,400 in average degree of polymerization, 99% by mole in degree of saponification, trade name: VF-PS2400) was cut into small pieces with a side of 5 mm or less, and the pieces were dissolved in hot water at 95° C., so that an aqueous 10% by weight polyvinyl alcohol solution was prepared.

(Formation of Hydrophilic Polymer Layer in Preparation of Laminate)

An 80 μm thick acrylic resin film (a lactonized polymethyl methacrylate film with a Re of 2 nm and a Rth of 0 nm) was used as a base material layer. The acrylic resin film was obtained by a process including melting and extruding a mixture (manufactured by NIPPON SHOKUBAI CO., LTD.) of 90 parts by weight of a lactone ring structure-containing (meth)acrylic resin (the weight ratio of copolymerized monomers:methyl methacrylate/2-(hydroxymethyl)methyl acrylate=8/2; about 100% in degree of lactonization) and 10 parts by weight of an acrylonitrile-styrene (AS) resin (TOYO AS AS20, manufactured by TOYO STYRENE CO., LTD.) to form a film and longitudinally stretching the film 2.0 times.

The aqueous polyvinyl alcohol solution was applied to the acrylic resin film and then dried at 120° C. for 10 minutes, so that a laminate was obtained, in which a 5 thick polyvinyl alcohol coating film was formed as a hydrophilic polymer layer.

(Stretching Process)

The laminate was subjected to free-end transverse uniaxial stretching to a stretch ratio of 5 times with a tenter under heating at 143° C. to form a stretched laminate. In this process, the chuck-to-chuck distance was 100 mm, and the stretching speed was 2 mm/second. After the stretching process, the polyvinyl alcohol coating film had a thickness of 2 μm.

(Dyeing Process)

The stretched laminate was then immersed in an iodine solution (iodine/potassium iodide/water=1/10/100 in weight ratio) at 30° C. for 60 seconds, while the tension was maintained. The stretched laminate was then dried at 60° C. for 4 minutes to give a polarizing plate. In the resulting polarizing plate (stretched laminate), the polyvinyl alcohol coating film had thicknesses of 2 μm and the base material layer had thicknesses of 39 μm.

Example 2

A polarizing plate was obtained by performing the same process as in Example 1, except that the stretch ratio in the stretching process was changed to 3 times. In the resulting polarizing plate (stretched laminate), the polyvinyl alcohol coating film had thicknesses of 3 μm and the base material layer had thicknesses of 47 μm.

Example 3

A polarizing plate was obtained by performing the same process as in Example 1, except that a 50 μm thick acrylic resin film (made of the same material as in Example 1) was used as the base material layer. In the resulting polarizing plate (stretched laminate), the polyvinyl alcohol coating film had thicknesses of 2 μm and the base material layer had thicknesses of 24 μm.

Example 4

A polarizing plate was obtained by performing the same process as in Example 1, except that a 50 μm thick norbornene resin film (ARTON FILM (trade name), manufactured by JSR Corporation) was used as the base material layer, the thickness of the polyvinyl alcohol coating film formed as the hydrophilic polymer layer was changed to 15 μm, and the stretch ratio in the stretching process was changed to 1.5 times. In the resulting polarizing plate (stretched laminate), the polyvinyl alcohol coating film had thicknesses of 3 μm and the base material layer had thicknesses of 41 μm.

Example 5

A polarizing plate was obtained by performing the same process as in Example 1, except that a 50 μm thick norbornene resin film (Zeonor FILM (trade name), manufactured by Zeon Corporation) was used as the base material layer, the thickness of the polyvinyl alcohol coating film formed as the hydrophilic polymer layer was changed to 15 μm, and the stretch ratio in the stretching process was changed to 3.3 times. In the resulting polarizing plate (stretched laminate), the polyvinyl alcohol coating film had thicknesses of 3 μm and the base material layer had thicknesses of 28 μm.

Example 6

A polarizing plate was obtained by performing the same process as in Example 1, except that the stretch ratio in the stretching process was changed to 3 times and that after the dyeing process, the process of immersing the product in an aqueous solution containing 3% by weight boric acid and 3% by weight potassium iodide at 30° C. for 30 seconds was performed before drying at 60° C. for 4 minutes. In the resulting polarizing plate (stretched laminate), the polyvinyl alcohol coating film had thicknesses of 3 μm and the base material layer had thicknesses of 39 μm.

Example 7

A polarizing plate was obtained by performing the same process as in Example 1, except that in the stretching process, the laminate was subjected to fixed-end transverse uniaxial stretching to a stretch ratio of 3 times with a tenter (while chucking the transverse direction) under heating at 143° C. to form a stretched laminate (in which the chuck-to-chuck distance was 100 mm, and the stretching speed was 2 mm/second. After the stretching process, the polyvinyl alcohol coating film had a thickness of 2 μm). In the resulting polarizing plate (stretched laminate), the polyvinyl alcohol coating film had thicknesses of 2 μm and the base material layer had thicknesses of 40 μm.

Example 8

A polarizing plate was obtained by the same process as in Example 7, except that the stretch ratio in the stretching process was changed to 3.5 times. In the resulting polarizing plate (stretched laminate), the polyvinyl alcohol coating film had thicknesses of 2 μm and the base material layer had thicknesses of 35 μm.

Example 9

A polarizing plate was obtained by performing the same process as in Example 1, except that a 40 μm thick acrylic resin film (made of the same material as in Example 1) was used as the base material layer. In the resulting polarizing plate (stretched laminate), the polyvinyl alcohol coating film had thicknesses of 2 μm and the base material layer had thicknesses of 18 μm.

For the polarizing plate obtained in each example, no defect such as breakage was observed in the stretching process.

[Evaluation]

The polarizing plates obtained in the examples were evaluated as described below. For the methods of measurement of curling under a humidified environment and measurement of optical properties, the polarizing plate obtained in each example was modified into a form close to a practically usable form in such a manner that a 38 μm thick release-treated polyester film was placed on one side of the polarizing plate (the surface of the polarizer layer, namely, the surface of the polyvinyl alcohol coating film as the hydrophilic polymer layer) with an acrylic pressure-sensitive adhesive (20 μm in thickness) interposed therebetween. The resulting laminate was evaluated as described below. The result is shown in Table 1.

(Observation of Curling Immediately after the Preparation)

The resulting polarizing plate was prevented from curling, even though the polarizer (polyvinyl alcohol coating film) was thin. Such a condition is indicated by "◯" in Table 1.

(Measurement of Curling Under Humidified Environment)

The polarizing plate was cut into a sample piece of 100 mm×150 mm having a long side in the stretching direction. The sample was allowed to stand in a thermo-hygrostat chamber at a temperature of 40° C. and a humidity of 92% RH for 24 hours. The sample was then taken out of the chamber and placed on a metal surface plate with its convex side facing downwardly, when the distance between the surface plate and each of four end points of the sample was measured. At this time, cases where the average of the values at the four points was less than 50 mm were evaluated as being at a level where curling was suppressed so that the polarizing plate was useful (indicated by "◯"). On the other hand, cases where the average was more than 50 mm were evaluated as being at a level where curling was significant so that the polarizing plate was unusable (indicated by "x").

(Methods for Determining the Optical Properties)

The optical properties of each obtained polarizing plate were determined using an integrating sphere-equipped spectrophotometer (V7100 manufactured by JASCO Corporation). In the measurement of the transmittance for each linearly polarized light, the transmittance for completely polarized light obtained through a Glan-Taylor prism polarizer was normalized as 100%. The single-piece transmittance (Ts), parallel transmittance ($H_0$) and crossed transmittance ($H_{90}$) were measured at a wavelength of 550 nm, and the degree of polarization (P) was determined from these values according to the formula below. These transmittances were Y values which had undergone luminosity correction in the two-degree visual field (C light source) according to JIS Z 8701.

Degree of polarization (%)=$\{(H_0-H_{90})/(H_0+H_{90})\}^{1/2}\times$ 100.

A single-piece transmittance (Ts) of 40% or more and a degree of polarization of 99% or more are selected as target values for a liquid crystal display. The polarizing plate obtained in each example achieved target values of the single-piece transmittance (Ts) and the degree of polarization. The sample that achieves such target values is indicated by "◯" in Table 1.

TABLE 1

| | | Base material layer | | | | | Hydrophilic polymer layer | | | | |
|---|---|---|---|---|---|---|---|---|---|---|---|
| | | Before stretching | After stretching | | Stretching process | | Before stretching | After stretching | Evaluation | | |
| | | | | | | | | | Curling | | |
| | Material | Thickness (μm) | Thickness (μm) | Water-vapor permeability (%) | Method | Stretch ratio (times) | Crosslinking process | Thickness (μm) | Thickness (μm) | Immediately after preparation | Humidified environment | Optical properties |
| Example 1 | Acrylic | 80 | 39 | 85 | Free-end | 5 | Absent | 5 | 2 | ◯ | ◯ | ◯ |
| Example 2 | Acrylic | 80 | 47 | 75 | Free-end | 3 | Absent | 5 | 3 | ◯ | ◯ | ◯ |

TABLE 1-continued

| | | Base material layer | | | Stretching process | | Hydrophilic polymer layer | | Evaluation | | |
| | | Before stretching | After stretching | | | | Before stretching | After stretching | Curling | | |
| | Material | Thickness (μm) | Thickness (μm) | Water-vapor permeability (%) | Method | Stretch ratio (times) | Crosslinking process | Thickness (μm) | Thickness (μm) | Immediately after preparation | Humidified environment | Optical properties |
|---|---|---|---|---|---|---|---|---|---|---|---|---|
| Example 3 | Acrylic | 50 | 24 | 119 | Free-end | 5 | Absent | 5 | 2 | ○ | ○ | ○ |
| Example 4 | Norbornene | 50 | 41 | 8 | Free-end | 1.5 | Absent | 15 | 3 | ○ | ○ | ○ |
| Example 5 | Norbornene | 50 | 28 | 11 | Free-end | 3.3 | Absent | 15 | 3 | ○ | ○ | ○ |
| Example 6 | Acrylic | 80 | 39 | 85 | Free-end | 3 | Present | 5 | 3 | ○ | ○ | ○ |
| Example 7 | Acrylic | 80 | 40 | 80 | Fixed-end | 3 | Absent | 5 | 2 | ○ | ○ | ○ |
| Example 8 | Acrylic | 80 | 35 | 90 | Fixed-end | 3.5 | Absent | 5 | 2 | ○ | ○ | ○ |
| Example 9 | Acrylic | 40 | 18 | 158 | Free-end | 5 | Absent | 5 | 2 | ○ | X | ○ |

The invention claimed is:

1. A polarizing plate, comprising:
a laminate comprising
a base material layer formed of a thermoplastic resin, and
a hydrophilic polymer layer,
wherein the laminate has undergone a stretching process, and
at least a dichroic substance is adsorbed to the hydrophilic polymer layer,
wherein the hydrophilic polymer layer of the stretched laminate has a thickness of 2 μm to 10 μm,
wherein the base material layer of the stretched laminate has a thickness of 5 μm to 100 μm and has a water-vapor permeability of 120 g/m$^2$/24 h or less, and
wherein the hydrophilic polymer layer of the stretched laminate functions as a polarizer and the base material layer is used as a transparent protective film for the polarizer.

2. The polarizing plate of claim 1, wherein the laminate comprising the base material layer and the hydrophilic polymer layer is obtained by applying a hydrophilic polymer-containing aqueous solution to the base material layer and then drying the solution.

3. The polarizing plate of claim 1, wherein the laminate comprising the base material layer and the hydrophilic polymer layer is formed by co-extrusion of a base material layer-forming material and a hydrophilic polymer layer-forming material.

4. The polarizing plate of claim 1, wherein in the laminate comprising the base material layer and the hydrophilic polymer layer, the base material layer and the hydrophilic polymer layer are laminated directly to each other.

5. The polarizing plate of claim 1, wherein a hydrophilic polymer that forms the hydrophilic polymer layer is a polyvinyl alcohol resin.

6. The polarizing plate of claim 1, wherein the hydrophilic polymer layer is crosslinked.

7. An optical film, comprising: a laminate comprising the polarizing plate of claim 1.

8. An image display, comprising: the optical film of claim 7.

9. An image display, comprising: the polarizing plate of claim 1.

10. A method for manufacturing a polarizing plate, comprising:
a step comprising applying a hydrophilic polymer-containing solution to a base material layer form of a thermoplastic resin and then drying the hydrophilic polymer-containing solution to form a hydrophilic polymer layer on the base material layer, so that a laminate comprising the base material layer and the hydrophilic polymer layer is obtained;
a stretching step comprising stretching the laminate to form a stretched laminate; and
a dyeing step comprising adsorbing a dichroic substance to the hydrophilic polymer layer of the laminate or the stretched laminate, wherein
the stretching in stretching step is performed so that the hydrophilic polymer layer of the stretched laminate has a thickness of 2 μm to 10 μm, and
the base material layer of the stretched laminate has a thickness of 5 μm to 100 μm and has a water-vapor permeability of 120 g/m$^2$/24 h or less.

11. The method for manufacturing a polarizing plate of claim 10, wherein a hydrophilic polymer that forms the hydrophilic polymer layer is a polyvinyl alcohol resin.

12. The method for manufacturing a polarizing plate of claim 10 further comprising a step comprising crosslinking the hydrophilic polymer layer of the laminate.

13. A method for manufacturing a polarizing plate, comprising:
a step comprising co-extruding a base material layer-forming material and a hydrophilic polymer layer-forming material to form a laminate comprising a base material layer formed of a thermoplastic resin and a hydrophilic polymer layer;
a stretching step comprising stretching the laminate to form a stretched laminate; and
a dyeing step comprising adsorbing a dichroic substance to the hydrophilic polymer layer of the laminate or the stretched laminate, wherein
the stretching in stretching step is performed so that the hydrophilic polymer layer of the stretched laminate has a thickness of 2 μm to 10 μm, and the base material layer of the stretched laminate has a thickness of 5 μm to 100 μm and has a water-vapor permeability of 120 g/m$^2$/24 h or less.

14. The method for manufacturing a polarizing plate of claim 13, wherein a hydrophilic polymer that forms the hydrophilic polymer layer is a polyvinyl alcohol resin.

15. The method for manufacturing a polarizing plate of claim 13, further comprising a step comprising crosslinking the hydrophilic polymer layer of the laminate.

\* \* \* \* \*